(12) United States Patent
Whybark

(10) Patent No.: US 11,328,000 B1
(45) Date of Patent: May 10, 2022

(54) METHOD, APPARATUS AND COMPUTER PROGRAM PRODUCT FOR TRANSFORMING STRUCTURED HIERARCHICAL DATA INTO FLATTENED LINEAGE AND ATTRIBUTE TABLES

(71) Applicant: Liberty Mutual Insurance Company, Boston, MA (US)

(72) Inventor: Jeff Whybark, Lynnwood, WA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 759 days.

(21) Appl. No.: 16/021,362

(22) Filed: Jun. 28, 2018

Related U.S. Application Data

(60) Provisional application No. 62/528,707, filed on Jul. 5, 2017.

(51) Int. Cl.
| | |
|---|---|
| *G06F 16/28* | (2019.01) |
| *G06F 16/81* | (2019.01) |
| *G06F 16/174* | (2019.01) |
| *G06F 16/2453* | (2019.01) |
| *G06F 40/117* | (2020.01) |

(52) U.S. Cl.
CPC ........ *G06F 16/282* (2019.01); *G06F 16/1744* (2019.01); *G06F 16/24534* (2019.01); *G06F 16/81* (2019.01); *G06F 40/117* (2020.01)

(58) Field of Classification Search
CPC .. G06F 16/282; G06F 16/81; G06F 16/24534; G06F 16/1744; G06F 40/117
See application file for complete search history.

(56) References Cited

U.S. PATENT DOCUMENTS

| | | | |
|---|---|---|---|
| 7,047,253 B1 | 5/2006 | Murthy et al. | |
| 7,478,100 B2 | 1/2009 | Murthy et al. | |
| 8,103,695 B2 | 1/2012 | Warner et al. | |
| 2003/0110150 A1* | 6/2003 | O'Neil ................... | G06F 16/86 |

(Continued)

FOREIGN PATENT DOCUMENTS

EP    2577873 B1    3/2016

OTHER PUBLICATIONS

Bourret, Ronald [online] [retrieved Aug. 7, 2018]. Retrieved from the Internet: <URL: http://www.rpbourret.com/xml/XMLAndDatabases.htm>. (2005) 33 pages.

*Primary Examiner* — Jensen Hu
(74) *Attorney, Agent, or Firm* — Alston & Bird LLP

(57) ABSTRACT

Example embodiments may flatten structured data (e.g., extensible markup language (XML)) to two tables, a lineage table and an attribute table. The lineage table describes hierarchical relationships in the structured data and values of respective elements. The attribute table contains a normalized list of attributes in the structured data. Together the lineage and attribute tables comprise data that could enable recreation of the structured data without any loss of data. In some examples, the tables may be compressed. The flattening of the structured data into two tables, and optional compression of the tables, provides for efficient access and querying of the data. Example embodiments may provide automated and/or processing of additional structured data, ongoing over time, even if the expected hierarchy of the data changes over time.

17 Claims, 9 Drawing Sheets

500

| xmlID | Tag1 | Value1 | Tag2 | Value2 | Tag3 | Value3 | Current Tag | Current Value | CurrentID | |
|---|---|---|---|---|---|---|---|---|---|---|
| 123 | AMXML | | | | | | AMXML | | 111 | 501 |
| 123 | AMXML | | Header | | | | Header | | 222 | 502 |
| 123 | AMXML | | Physical Object | | | | Physical Object | | 333 | 503 |
| 123 | AMXML | | Physical Object | | Physical Object Detail | IFTVXIEF | Physical Object Detail | IFTVXIEF | 444 | 504 |
| 123 | AMXML | | Physical Object | | Physical Object Detail | FORD | Physical Object Detail | FORD | 555 | 505 |
| 123 | AMXML | | Physical Object | | Physical Object Detail | F-150 | Physical Object Detail | F-150 | 666 | 506 |

(56) References Cited

U.S. PATENT DOCUMENTS

| | | |
|---|---|---|
| 2004/0044959 A1 | 3/2004 | Shanmugasundaram |
| 2009/0319546 A1* | 12/2009 | Shaik .................... G06F 16/258 |
| 2011/0029489 A1* | 2/2011 | Zhao ................. G06F 16/24556 |
| | | 707/648 |
| 2011/0295836 A1* | 12/2011 | Bolsius ................. G06F 16/243 |
| | | 707/714 |
| 2012/0226720 A1* | 9/2012 | Schnelle ................. G06F 16/86 |
| | | 707/803 |
| 2014/0114905 A1* | 4/2014 | Kozina ................. G06F 16/219 |
| | | 707/600 |
| 2014/0280363 A1* | 9/2014 | Heng ................. G06F 16/2246 |
| | | 707/802 |
| 2015/0356094 A1* | 12/2015 | Gorelik ................. G06F 16/211 |
| | | 707/748 |

* cited by examiner

500

| xmlID | Tag1 | Value1 | Tag2 | Value2 | Tag3 | Value3 | Current Tag | Current Value | CurrentID |
|---|---|---|---|---|---|---|---|---|---|
| 123 | AMXML | | | | | | AMXML | | 111 |
| 123 | AMXML | | Header | | | | Header | | 222 |
| 123 | AMXML | | Physical Object | | | | Physical Object | | 333 |
| 123 | AMXML | | Physical Object | | Physical Object Detail | 1FTVX1EF | Physical Object Detail | 1FTVX1EF | 444 |
| 123 | AMXML | | Physical Object | | Physical Object Detail | FORD | Physical Object Detail | FORD | 555 |
| 123 | AMXML | | Physical Object | | Physical Object Detail | F-150 | Physical Object Detail | F-150 | 666 |

| xmlID | AttributeName | AttributeValue | TagName | Tag ID |
|---|---|---|---|---|
| 123 | Version | 2.0.0 | Header | 222 |
| 123 | Name | coveredVehicle | PhysicalObject | 333 |
| 123 | Name | vin | PhysicalObjectDetail | 444 |
| 123 | Name | polkMake | PhysicalObjectDetail | 555 |
| 123 | Name | polkModel | PhysicalObjectDetail | 666 |

| Attribute Value | CurrentValue |
|---|---|
| vin | 1FTVX1EF |
| pokMake | FORD |
| pokModel | F-150 |

Fig. 7

| Vin | Make | Model |
|---|---|---|
| 1FTVX1EF | FORD | F-150 |

Fig. 8

METHOD, APPARATUS AND COMPUTER PROGRAM PRODUCT FOR TRANSFORMING STRUCTURED HIERARCHICAL DATA INTO FLATTENED LINEAGE AND ATTRIBUTE TABLES

CROSS REFERENCES TO RELATED APPLICATIONS

This application claims the benefit of priority to U.S. Provisional Application No. 62/528,707, filed Jul. 5, 2017 and titled, "Flattening and Processing of Structured Data," the contents of which is hereby incorporated by reference in its entirety.

TECHNOLOGICAL FIELD

An example embodiment of the present invention relates generally to data transformation, and more particularly, to a method, apparatus and computer program product for transforming structured hierarchical data into flattened lineage and attribute tables.

BACKGROUND

The amount of digital data collected or generated and shared across and within networks is ever increasing. Vast repositories are developed and maintained by nearly every type of business entity, such as service providers, retailers, insurance agencies, marketing companies, data mining companies, data brokers, and/or the like. The data is often converted to a standard format for redistribution and consumption by other systems or recipients over a network.

One commonly used format is XML (extensible markup language). In some instances, the precise schema, or hierarchy of expected XML data may change over time, as various systems evolve to collect more data, or change data architectures to meet their internal or client needs. The large volumes of complex XML data, and the potentially changing formats of the data may make the data difficult for interfacing systems to process.

Over the years, XML parsing processes and shredders have been implemented to parse XML data into relational databases. However, in some instances, the complexity of the XML objects results in a large number of database tables, leading to wasted resources and inefficient access. Additionally, the dynamic nature of the XML data requires business customers or other developers to have extensive knowledge of the architecture and to perform arduous data development and re-development tasks to utilize the data as desired.

BRIEF SUMMARY

A method, apparatus, and computer program product are therefore provided for transforming structured hierarchical data into flattened lineage and attribute tables. According to example embodiments, the structured data (e.g., extensible markup language (XML)) may be flattened into two tables, a lineage table and an attribute table. The lineage table may describe hierarchical relationships in the structured data, and values of respective elements. The attribute table may include a normalized list of attributes occurring in the structured data. Together, the lineage and attribute table comprises data that enables recreation of the structured data without any loss of data from the original structured data. Additionally, according to example embodiments described herein, the tables may be compressed, enabling efficient access and querying of the data. Example embodiments may therefore provide for automated processing of subsequently received structured data, even if the expected hierarchy of the data changes over time.

A method is provided according to example embodiments, the method comprising receiving structured data comprising elements arranged in a hierarchy. The method further comprises populating, by a processor and based on the structured data, a lineage table defining the hierarchy. Populating the lineage table may comprise generating a lineage record in the lineage table for each element in the structured data. Each lineage record may identify (i) a value of the respective element, (ii) ancestrally related elements of the respective element, and (iii) values of the ancestrally related elements.

In certain example embodiments, each lineage record may comprise tag-value column pairs comprising names of the ancestrally related elements and their respective values. In some embodiments, the method further comprises populating each lineage record with an indicator of a deepest element identified by the respective lineage record, wherein depth is defined by the hierarchy.

The method may further comprise populating, by the processor and based on the structured data, an attribute table comprising attributes of the elements. Populating the attribute table may comprise inserting the attributes of elements into respective attribute records. Each attribute record may be associated with a particular lineage record representing the element that the respective attribute describes.

In some embodiments, the method further includes receiving additional structured data, and in response to the receipt of the additional structured data, appending, based on the additional structured data, (i) additional lineage records to the lineage table, and (ii) additional attribute records to the attribute table.

The method may further include compressing the lineage table and the attribute table to reduce an amount of memory utilized to store the lineage table and the attribute table. Compressing the lineage table and the attribute table may include enabling (i) more efficient joining of the lineage table and the attribute table relative to joining of non-compressed tables, and (ii) more efficient querying of the joined lineage table and the attribute table relative to querying non-compressed tables.

An apparatus is also provided, the apparatus comprising at least one processor and at least one memory including computer program code, the at least one memory and the computer program code configured to, with the processor, cause the apparatus to at least receive structured data comprising elements arranged in a hierarchy, and populate, based on the structured data, a lineage table defining the hierarchy.

In some embodiments, the at least one memory and the computer program code are further configured to, with the processor, cause the apparatus to at least populate each lineage record with an indicator of a deepest element identified by the respective lineage record, wherein depth is defined by the hierarchy.

The at least one memory and the computer program code may be configured to, with the processor, cause the apparatus to at least populate, based on the structured data, an attribute table comprising attributes of the elements, wherein populating the attribute table comprises inserting the attributes of elements into respective attribute records, and wherein each attribute record is associated with a particular lineage record representing the element that the respective attribute describes.

The at least one memory and the computer program code are further configured to, with the processor, cause the apparatus to at least receive additional structured data, and in response to the receipt of the additional structured data, append, based on the additional structured data, (i) additional lineage records to the lineage table, and (ii) additional attribute records to the attribute table.

The at least one memory and the computer program code may be further configured to, with the processor, cause the apparatus to at least compress the lineage table and the attribute table to reduce an amount of memory utilized to store the lineage table and the attribute table.

A computer program product is also provided. The computer program product may comprise at least one non-transitory computer-readable storage medium having computer-executable program code instructions stored therein, the computer-executable program code instructions comprising program code instructions to receive structured data comprising elements arranged in a hierarchy. The computer-executable program code instructions may further comprise program code instructions to populate, based on the structured data, a lineage table defining the hierarchy.

In some embodiments, the computer-executable program code instructions may further comprise program code instructions to populate each lineage record with an indicator of a deepest element identified by the respective lineage record, wherein depth is defined by the hierarchy. In some embodiments, the computer-executable program code instructions further comprise program code instructions to populate, based on the structured data, an attribute table comprising attributes of the elements. The computer-executable program code instructions may further include program code instructions to receive additional structured data, and, in response to the receipt of the additional structured data, append, based on the additional structured data, (i) additional lineage records to the lineage table, and (ii) additional attribute records to the attribute table. The computer-executable program code instructions may further include program code instructions to compress the lineage table and the attribute table to reduce an amount of memory utilized to store the lineage table and the attribute table.

A method is provided according to example embodiments, the method comprising receiving structured data comprising elements arranged in a hierarchy. The method further comprises populating, by a processor and based on the structured data, a lineage table defining the hierarchy. Populating the lineage table may comprise generating a lineage record in the lineage table for each element in the structured data. Each lineage record may identify (i) a value of the respective element, (ii) ancestrally related elements of the respective element, and (iii) values of the ancestrally related elements.

BRIEF DESCRIPTION OF THE DRAWINGS

The accompanied drawings are not necessarily drawn to scale.

FIGS. 5-8 are example tables generated in accordance with example embodiments of the present disclosure;

DETAILED DESCRIPTION

Figure 1A:
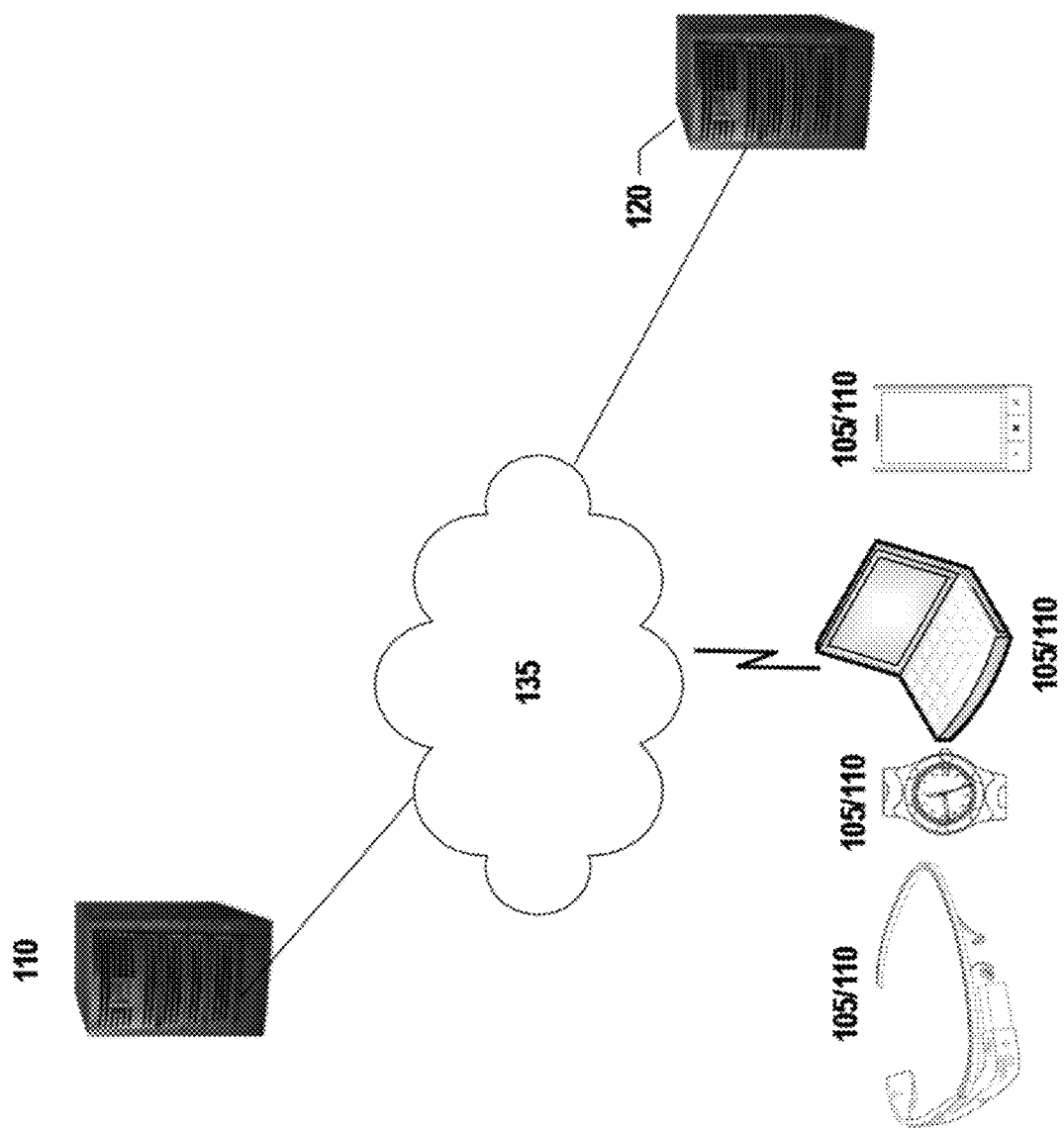
FIG. 1A is a diagram of a system that can be used to practice example embodiments of the present disclosure.

Various embodiments of the present disclosure now will be described more fully hereinafter with reference to the accompanying drawings, in which some, but not all embodiments are shown. Indeed, the operations and functionality described herein may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Example embodiments may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments may also take the form of an entire hardware embodiment, an entire computer program product embodiment, and/or an embodiment that comprises combination of computer program products and hardware performing certain steps or operations.

Example embodiments are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1A provides an illustration of a system that can be used in conjunction with various embodiments of the present disclosure. As shown in FIG. 1A, the system may include one or more user computing entities 105, one or more source computing entities 110, one or more data management computing entities 120, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), or the like. Additionally, while FIG. 1A illustrates certain system entities as separate, standalone entities, the various embodiments are not limited to this particular architecture.

Figure 1B:
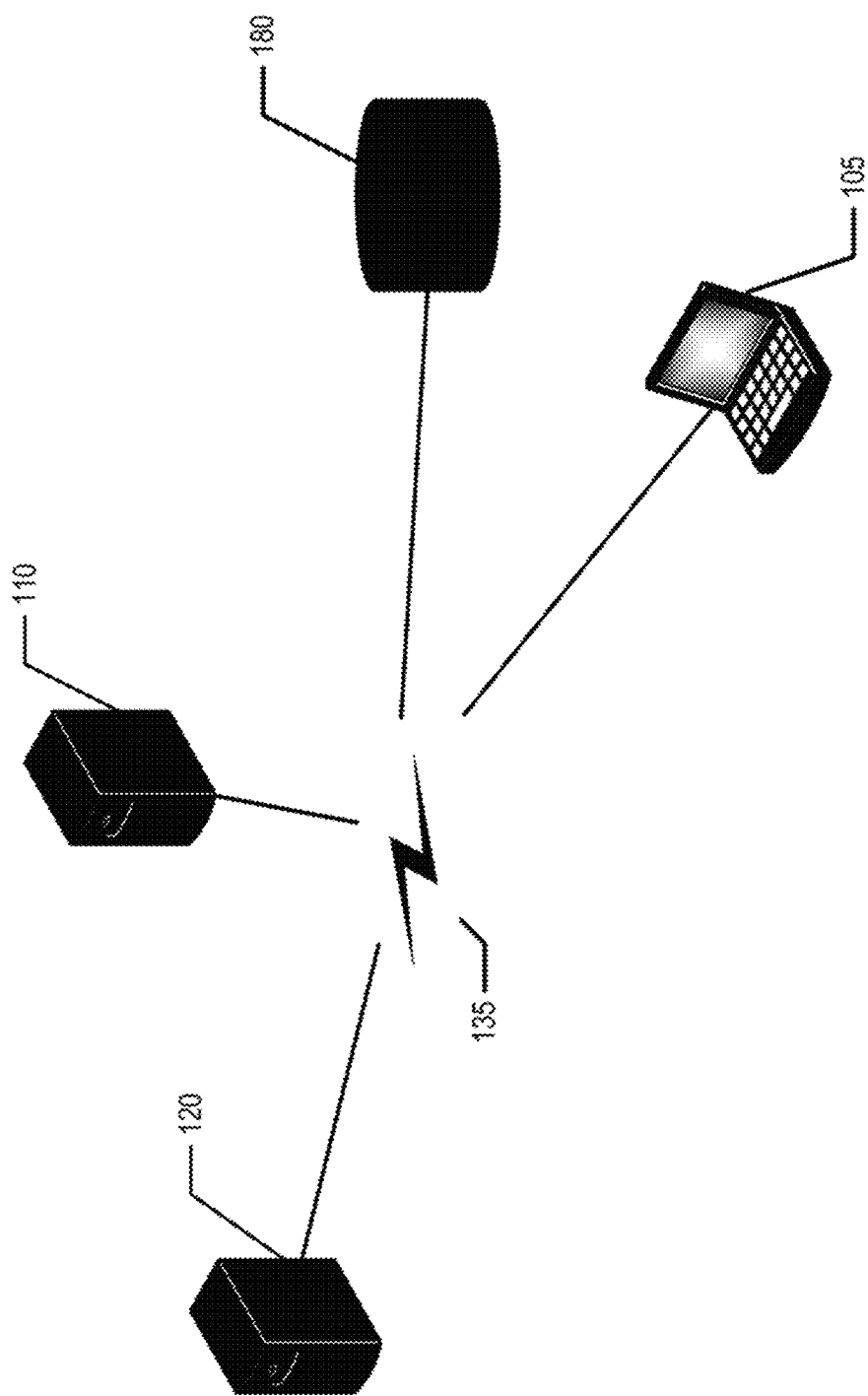
FIG. 1B is a diagram of a system that can be used to practice example embodiments of the present disclosure.

FIG. 1B provides an illustration of a system that can be used in conjunction with various embodiments of the present disclosure. In general, the data management computing entities 120 receives structured data, such as XML files, from one or more source computing entities 110. It will be appreciated that XML is used throughout as an example of structured data, but that any other format of structured data comprising hierarchical relationships may be flattened as described herein. The data management computing entity 120 may process the structured data according to example embodiments as described in further detail below to generate flattened data. The resultant flattened data may then be transmitted to and/or stored in database 180 in lineage and attribute tables.

A user may optionally utilize a user computing entity 105 to query the database 180 and/or develop additional computer programming product for storage on a source computing entity 110 (that performs systematic querying of the database 180, for example). As another example, a user may use a user computing entity 105 to direct the data management computing entity 120 to configure the database 180.

a. Exemplary Data Management Computing Entity

Figure 2:
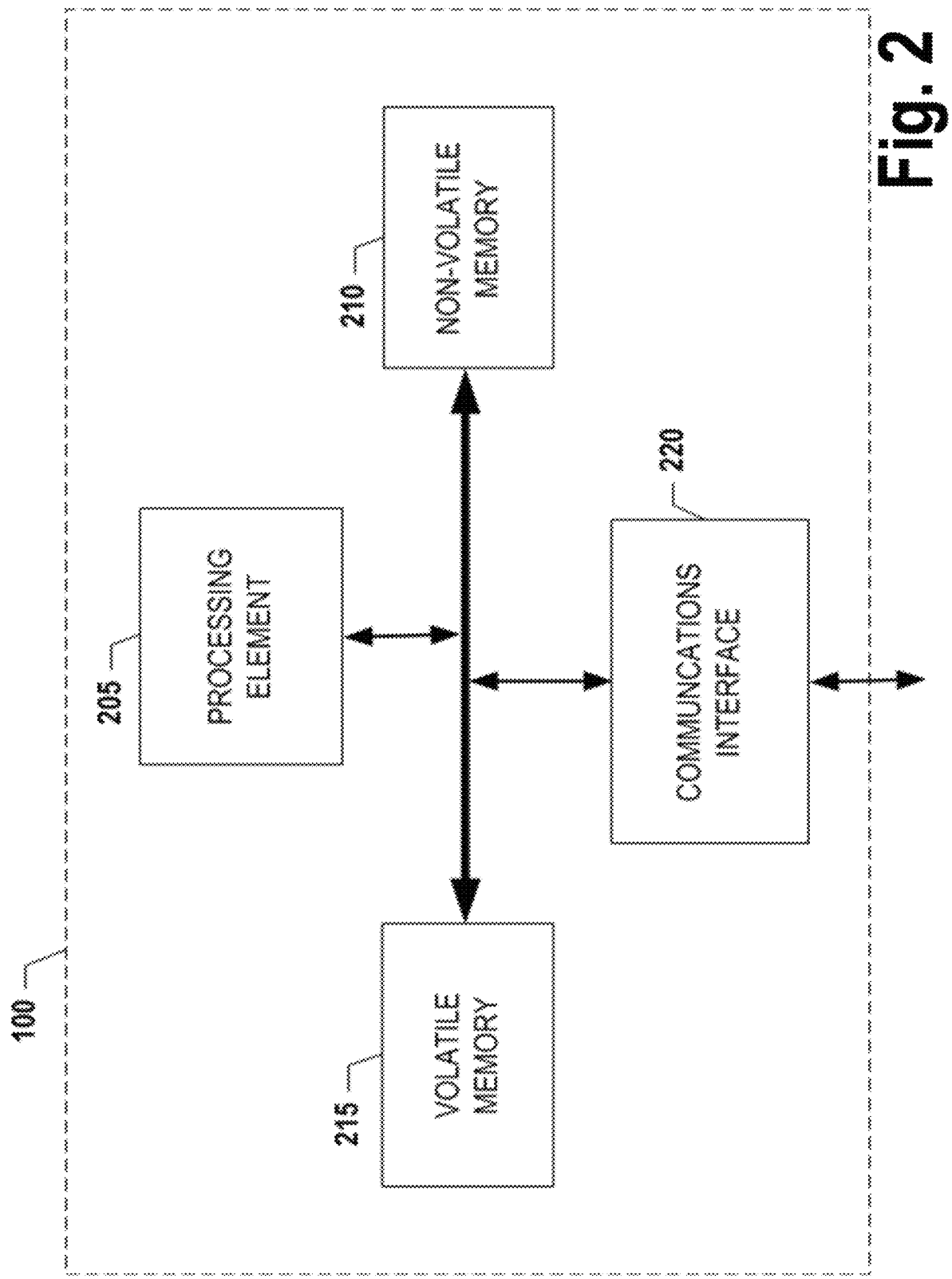
FIG. 2 is a schematic of a data management computing entity in accordance with example embodiments of the present disclosure.

FIG. 2 provides a schematic of a data management computing entity 120 according to an example embodiment. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data management computing entity 120 may also include one or more communications interfaces 320 for communicating with various computing entities, such as by communicating data, content, information, and/or similar terms used herein interchangeably that can be transmitted, received, operated on, processed, displayed, stored, and/or the like. For instance, the data management computing entity 120 may communicate with source computing entities 105, and/or the like.

As shown in FIG. 2, in example embodiments, the data management computing entity 120 may include or be in communication with one or more processing elements 305 (also referred to as processors, processing circuitry, and/or similar terms used herein interchangeably) that communicate with other elements within the data management computing entity 120 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to example embodiments when configured accordingly.

In one embodiment, the data management computing entity 120 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the data management computing entity 120 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the data management computing entity 120 with the assistance of the processing element 305 and operating system.

As indicated, in one embodiment, the data management computing entity 120 may also include one or more communications interfaces 320 for communicating with various computing entities, such as by communicating data, content, information, and/or similar terms used herein interchangeably that can be transmitted, received, operated on, processed, displayed, stored, and/or the like. For instance, the data management computing entity 120 may communicate with computing entities or communication interfaces of the source computing entity 105, and/or the like.

As indicated, in one embodiment, the data management computing entity 120 may also include one or more communications interfaces 320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data management computing entity 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The data management computing entity 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the data management computing entity 120's components may be located remotely from other data management computing entity 120 components, such as in a distributed system. Furthermore, one or more of the components may be combined and additional components performing functions described herein may be included in the data management computing entity 120. Thus, the data management computing entity 120 can be adapted to accommodate a variety of needs and circumstances.

b. Exemplary Database

In example embodiments, database 180 may embody a data management computing entity 120 such as the example entity of FIG. 2. In this regard, the database 180 may comprise a processing element 305, non-volatile memory 310, volatile memory 315, and/or communications interface 320. The communications interface 320 may enable communication between the database 180 and any of the user computing entity 105, data management computing entity 120, and/or source computing entity 110, for example.

c. Exemplary User Computing Entity

Figure 3:
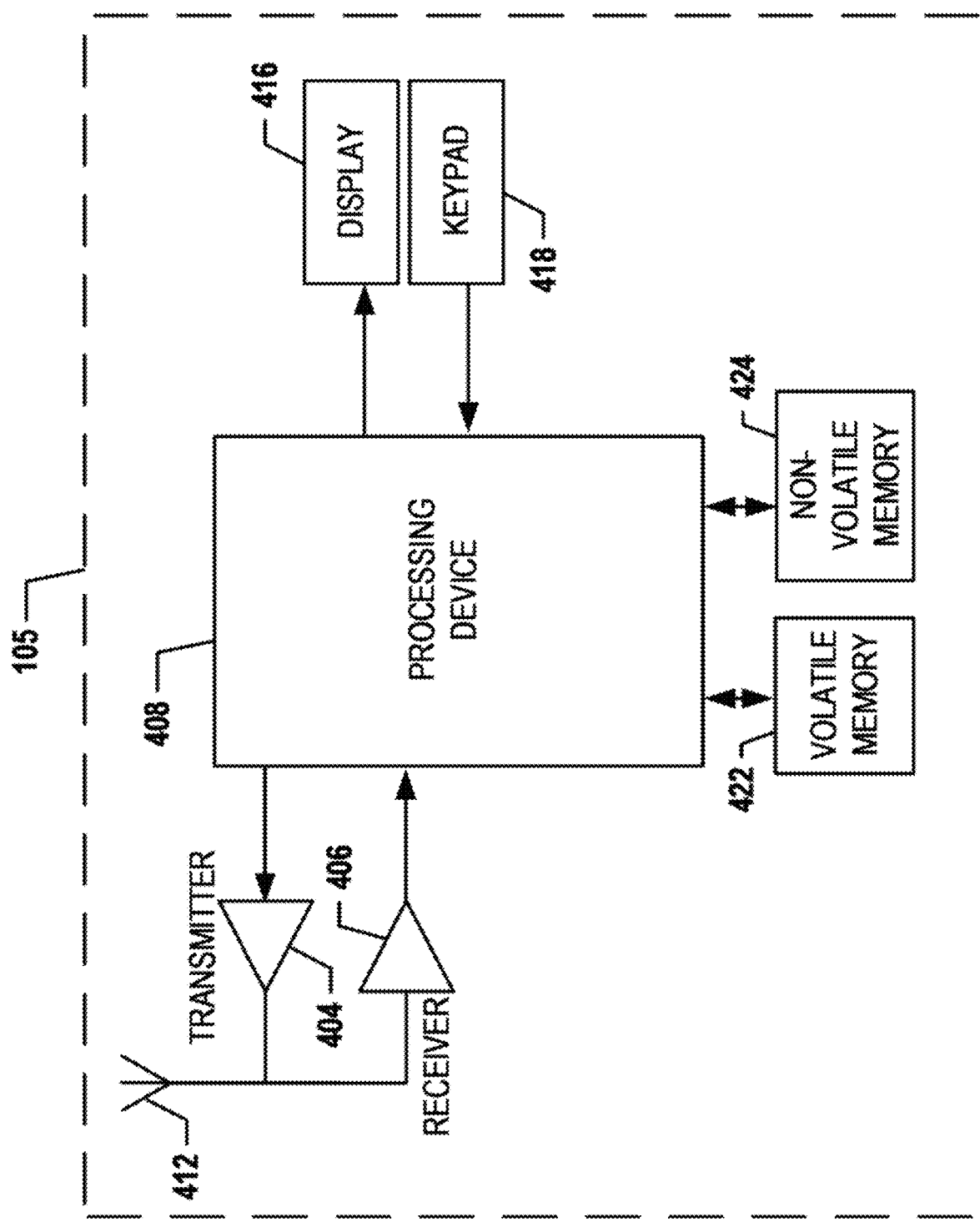
FIG. 3 is a schematic of a user computing entity in accordance with example embodiments of the present disclosure.

In example embodiments, a user may be an individual, party, family, organization, insurance agent, insurance policy holder, customer, prospective customer, developer, and/or the like. FIG. 3 provides an illustrative schematic representative of a user computing entity 105 that can be used in conjunction with example embodiments. In one embodiment, the user computing entities 105 may include one or more components that are functionally similar to those of the data management computing entity 120 and/or as described below. In general, a user computing entity 105 is a computing entity operated by and/or on behalf of a user (e.g., accessing an application provided the data management computing entity 120, accessing a website hosted by the data management computing entity 120, and/or the like). As shown in FIG. 3, a user computing entity 105 can include an antenna 412, a transmitter 404 (e.g., radio), a receiver 406 (e.g., radio), and a processing element 408 that provides signals to and receives signals from the transmitter 404 and receiver 406, respectively. In various embodiments, the user computing entity 105 may further comprise a digital image capturing element (e.g., a digital camera), a location sensor (e.g., GPS sensor), and/or the like.

The signals provided to and received from the transmitter 404 and the receiver 406, respectively, may include signaling information/data in accordance with an air interface standard of applicable wireless systems to communicate with various entities, such as data management computing entity 120, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth® protocols, USB protocols, and/or any other wireless protocol.

Via these communication standards and protocols, the user computing entity 105 can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

According to one embodiment, the user computing entity 105 may comprise a location sensor and/or other location determining aspects, devices, modules, functionalities, and/or similar words used herein interchangeably. For example, the user computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 105 position in connection with a variety of other systems, including cellular towers, Wi-Fi access points, and/or the like. Similarly, the user computing entity 105 may include indoor positioning aspects, such as a location module adapted to acquire, for example, latitude, longitude, altitude, geocode, course, direction, heading, speed, time, date, and/ or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the user computing entity 105 to interact with and/or cause display of information. The user input interface can comprise any of a number of devices allowing the user computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer device can collect contextual information/data as part of the telematics data.

The user computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105.

d. Exemplary Source Computing Entity

In general, a source computing entity 110 is a computing entity that provides data records, such as structured data files, XML files, and/or the like, to the data management computing entity 120 for processing. In an example embodiment, a user computing entity 105 may be a source computing entity 110. In one embodiment, the source computing entities 110 may each include one or more components that are functionally similar to those of the data management computing entity 120 and/or the customer computing entity 105. For example, in one embodiment, each of the source computing entities 110 may include: (1) a processing element that communicates with other elements via a system interface or bus; (2) a user interface; (3) transitory and non-transitory memory; and (4) a communications interface.

As previously noted, the source computing entity 110 may comprise a user interface. For example, the user interface may be an application, browser, user interface, dashboard, webpage, and/or similar words used herein interchangeably executing on and/or accessible via the source computing entity 110 to interact with and/or cause display of information/data from the data management computing entity 120 and/or the user computing entity 105, as described herein. These architectures are provided for exemplary purposes only and are not limiting to the various embodiments.

e. Exemplary Networks

In one embodiment, any two or more of the illustrative components of the architecture of FIG. 1A may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), metropolitan area networks (MANs), wide area networks (WANs), local area networks (LANs), or personal area networks. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Figure 4:
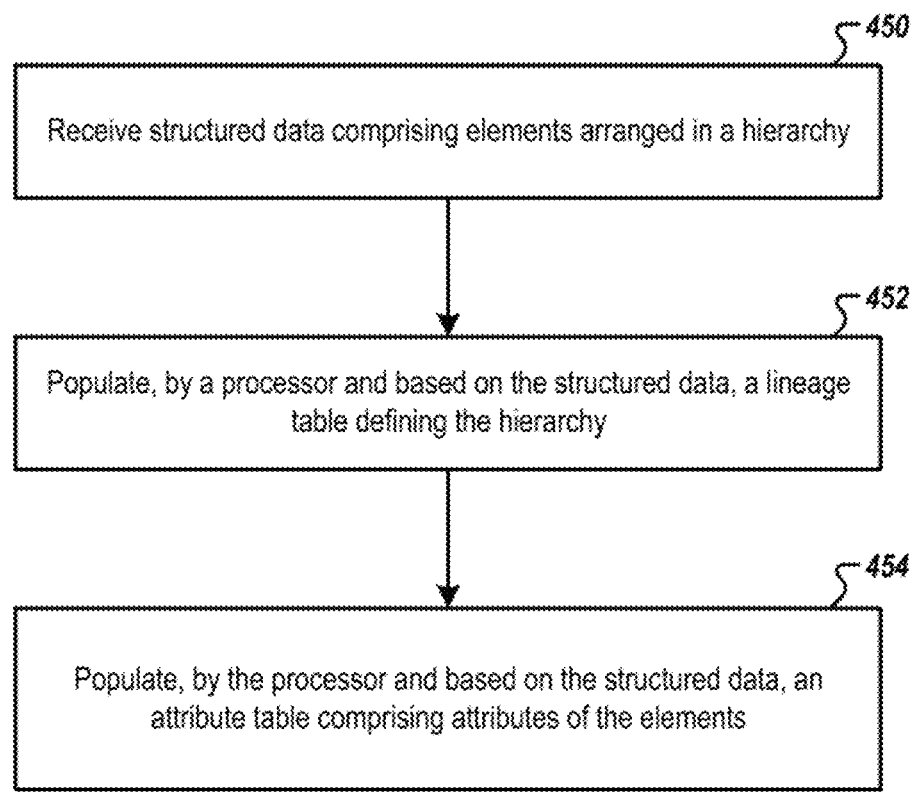
FIG. 4 is a flowchart illustrating various processes in accordance with example embodiments of the present disclosure.

Reference will now be made to various other figures that include operations and processes that may be performed. FIG. 4 provides a flowchart illustrating various processes and procedures in accordance with example embodiments.

At block 450, data management computing entity 120 may include means, such as communications interface 320 and/or the like, for receiving structured data comprising elements arranged in a hierarchy. The structured data may be received from source computing entity 110, for example, over a network and by various means. For example, receiving the structured data may include reading the data from a predefined network location. In some embodiments, the structured data may be stored to a predefined network location by the source computing entity 110 by way of a routine batch process and/or the like, and accessed by example embodiments for processing and flattening and described in further detail below.

The structured data may be formatted in XML, for example, and may comprise attributes. Some elements may comprise optional values and/or optional child elements. The order in which the elements appear and special characters occurring in the structured data may define the hierarchy of elements. For example, Table 1 provides example structured data that may be received by example embodiments.

TABLE 1

| | |
|---|---|
| 1 | <AMXML> |
| 2 |   <Header version=2.0.0/> |

TABLE 1-continued

```
3    <PhysicalObject name="coveredVehicle">
4        <PhysicalObjectDetail name="vin">1FTVX1EF</PhysicalObjectDetail>
5        <PhysicalObjectDetail name="polkMake">FORD</PhysicalObjectDetail>
6        <PhysicalObjectDetail name="polkModel">F-150</PhysicalObjectDetail>
7    </PhysicalObject>
8 </AMXML>
```

The structured data in Table 1 is arranged in a hierarchy. The Physical Object element on line 3 has three respective descendent elements of type PhysicalObjectDetail on lines 4-6. The PhysicalOPbjectDetail element on line 4 has a value of "1FTVX1EF," and an attribute, 'name,' having a value of "vin." The PhysicalOPbjectDetail element on line 5 has a value of "FORD," and an attribute, 'name,' having a value of "polkMake." The PhysicalOPbjectDetail element on line 6 has a value of "F-150," and an attribute, 'name' having a value of "polkModel."

At block 452, data management computing entity 120 may include means, such as communications interface 320, processing element 305, volatile memory 315, non-volatile memory 310 and/or the like, for populating, based on the structured data, a lineage table defining the hierarchy of the structured data. In some examples, the lineage table may be populated on the database 180. Example embodiments may flatten the structured data by recursively processing the structured data with computer program code. The code may be written in Java, or any other code configurable to process the structured data and reformat the data into database tables as described in further detail below.

The population of the lineage table is described in further detail by way of example with reference to example lineage table 500 of FIG. 5. The example lineage table 500 corresponds to the structured data of Table 1, provided above. The lineage table 500 defines the hierarchy of the structured data in Table 1.

As shown in FIG. 5, the lineage table 500 comprises one record for each element in the structured data. In this regard, populating the lineage table may comprise generating a lineage record in the lineage table for each element in the structured data. For example, record 501 represents the outermost AMXML element beginning on line 1 and ending on line 8 of the structured data in Table 1. Record 502 represents the Header element on line 2 of the structure data. Record 503 represents the PhysicalObject element beginning on line 3 and ending on line 7. Record 504 represents the PhysicalObjectDetail element on line 4. Record 505 represents the PhysicalObjectDetail record on line 5. Record 505 represents the PhysicalObjectDetail record on line 6.

The column 'CurrentTag' denotes the element name of the represented element, and the 'CurrentValue' column comprises the value of the represented element (if any). Records 501, 502 and 503 have no associated values because the corresponding XML elements in Table 1 have no values.

The lineage table 500 further comprises a column 'xmlID,' which may be a unique identifier of the source file containing the structured data and/or the unique identifier of each individual file (e.g., XML file) within a source file comprising the structured data.

Additionally, a lineage table may comprise any number of tag-value column pairs to indicate the ancestors of the particular element represented by a particular record. Based upon the example structured data of Table 1, and for the purpose of simple illustration, lineage table 500 comprises 3 sets of tag-value column pairs. Tag1 represents a tag or element name of the outermost, or highest level ancestral element of the element represented by the particular record. Value1 is the value, if any, of the element indicated by Tag1. Within a record, the next tag-value pair, such as (Tag2, Value2) represents the child element of the element indicated by the prior tag-value pair (e.g., (Tag1,Value1)), that is an ancestor to the element represented by the particular record.

In each record, the last tag-value pair populated matches the (CurrentTag,CurrentValue) pair. This design may indicate to a querying program or request that that when a particular tag-value pair matches the CurrentTag-CurrentValue pair, there are no more tag-value pairs beyond the tag-value pair in the particular record, or, if additional tag-value columns are present in the lineage table, the fields are empty (such as Tag2, Value2, Tag3, and Value3 of record 501). In this regard, each lineage record may comprise an indicator of a deepest element identified by the respective lineage record, wherein the depth is defined by the hierarchy of the structured data. In the example lineage table 500, the indicator of the deepest element identified by the respective lineage record is the last populated 'tag' column of the record, appreciating that the associated value column may or may not be empty.

For example, record 504 represents the PhysicalObjectDetail record on Table 1, line 4, having a value of 1FTVX1EF. The (Tag3,Value3) pair matches the (CurrentTag,CurrentValue) pair. (Tag2,Value2), populated as ("PhysicalObject",null) indicates the parent element to (Tag3,Value3). The (Tag1,Value1), populated as ("AMXML",null) pair indicates the parent element to (Tag2, Value2). Example embodiments may populate the lineage table by recursively traversing or parsing each element of the structured data, and populating a lineage record for each element processed.

The number of tag-value column pairs may be predefined and may represent the largest depth or largest expected depth of the structured data. Said differently, the number of tag-value column pairs may represent the highest number of expected generational levels of descendent elements to the highest level element, or outermost element in the structured data. For example, although only 3 tag-value column pairs are present in the example lineage table 500, any number of tag-value column pairs may be configured, such as 30. The number of tag-value column pairs may therefore vary based on the complexity of the associated structured data, or expected structured data. It will be further appreciated that although the tag-value pairs in the lineage table 500 are presented in order from eldest ancestor to youngest child element, example embodiments may utilize any ordering of the tag-value pairs, such as from youngest child element to eldest ancestor.

As set forth above, each lineage record may there identify (i) a value of the respective element, (ii) ancestrally related elements of the respective element, and/or (iii) values of the ancestrally related elements. The hierarchal relationships within the structured may therefore be represented in the lineage table. The precise ordering and nesting of all the elements of the structured data, and therefore the hierarchical relationships of elements could therefore be recreated given the populated lineage table. The attributes of the elements, on the other hand, may not be identified in the lineage table and/or lineage records, and may instead be populated in a separate attribute table, described below.

Returning to the flowchart of FIG. 4, at block 454, data management computing entity 120 may include means, such as communications interface 320, processing element 305, volatile memory 315, non-volatile memory 310 and/or the like, for populating, based on the structured data, an attribute table comprising attributes of the elements. Populating the attribute table may comprise inserting the attributes of elements into respective attribute records. Each attribute record may be associated with a particular lineage record representing the element that the respective attribute describes.

FIG. 6 provides an example attribute table 600 associated with, or comprised by, the structured data of Table 1. As in the lineage table, a column 'xmlID' is populated with a unique identifier of the source file from which the particular record originated. A column 'TagID' links a record in the attribute table to the 'CurrentID' column in lineage table. Although record 501 in the lineage table 500 has a CurrentId of value "111," there is no record in the attribute table 600 having a TagID with a value of "111" because the element represented by record 501 has no attributes. The column 'AttributeName' indicates the name of an attribute associated with the element, and the column 'AttributeValue' indicates the value of the attribute.

Optional column 'TagName' indicates the name of the tag or element. Record 601 indicates that the element "PhysicalObect" associated with TagID "222" (Record 502 from the lineage table 500) has an attribute by the name of "Version" and has a value of "2.0.0." It will be appreciated that some elements may comprise multiple attributes such that there are multiple records in an attribute table having the same TagID. In some examples, such as those in which there are no attributes, or the attributes are not expected to be needed by any querying program or entity, the attribute table 600 may be empty, or may not be generated.

Given a complete lineage table and attribute table, such as the lineage table 500 and attribute table 600, the associated structured data such as that of Table 1 could potentially be accurately and entirely recreated. The structured data could be recreated via a recursive computer program, for example. In this regard, example embodiments may provide a database-compatible format of the structured data without any loss of data or the hierarchical relationships or attributes contained therein.

Additionally or alternatively, data analysts, business clients, and/or the like may utilize the lineage table and/or attribute table to query the data and/or generate reports without any loss of the structured data. For example, a user may utilize a user computing entity 105 to write a query, such as the SQL (structured query language) of Table 2, to retrieve the desired data in a particular format.

TABLE 2

| 1 | SELECT att.AttributeValue, lin.CurrentValue FROM |
| 2 | LineageTable lin INNER JOIN AttributeTable att |
| 3 | ON att.xmlID = lin.xmlID and att.TagID = lin.CurrentID |
| 4 | Where att.AttributeValue in ('vin','polkMake','polkModel') |

The resultant example data that may be retrieved from running the query of Table 2 is provided in table 700 of FIG. 7, which lists the values of the requested attributes. Additional querying and/or de-normalizing may result in data such as the data provided in table 800 of FIG. 8, which formats the attribute values as columns and populates a single vehicle instance as a single record in the database table. In this regard, the example embodiments provided herein enable for more efficient processing and querying of the structured data. The structured data may be reformatted as desired by a data developer or data analysis, and easily retrieved for subsequent reporting and analytics. The example query in Table 2 illustrates the simplicity of the SQL required to query the flattened data, as opposed to the below code in Table 3 that would otherwise be needed, without the benefit of the embodiments described herein.

Table 3 provides example computer program code, in SQL, that could be used to query the structured data without the use of the example embodiments first flattening the data. Said differently, the query of Table 3 may be used to query the un-flattened data. In this regard, Table 3 may be considered to provide an example conventional method to query the structured data (e.g., XML) in lieu of the flattening and associated querying of the flattened data provided herein.

TABLE 3

| 1 | with hv_vehdenormalized as ( |
| 2 | SELECT DISTINCT |
| 3 | A.reference_key, |
| 4 | A.VehicleId, |
| 5 | PHYSICALOBJECTDETAIL.NAME as VehicleAttribute, xpath_string (message_xml,concat('AMXML/Command/Account/CommercialPolicy/Policy/BaseForm/Vehicle/PhysicalObject[@id="',A.VehicleID,'"]/PhysicalObjectDetail[@name="', |
| 6 | PHYSICALOBJECTDETAIL.NAME,'"]')) |
| 7 | as VehicleDetail |
| 8 | FROM ( |
| 9 | SELECT |
| 10 | reference_key, |
| 11 | xpath_string (message_xml,concat('AMXML/Command/Account/CommercialPolicy/Policy/BaseForm/Vehicle/PhysicalObject[@id="',PHYSICALOBJECT.ID,'"]/@id')) as VehicleId, |
| 12 | message_xml |
| 13 | FROM |
| 14 | hv_paqdbquotes_ext |
| 15 | LATERAL VIEW explode(xpath(message_xml,'AMXML/Command/Account/CommercialPolicy/Policy/BaseForm/Vehicle/PhysicalObject/@id')) PHYSICALOBJECT as ID |
| 16 | WHERE |
| 17 | to_date(trans_timestamp) = '2016-03-01' |
| 18 | ) A |
| 19 | LATERAL VIEW explode(xpath(message_xml,'AMXML/Command/Account/CommercialPolicy/Policy/BaseForm/Vehicle/PhysicalObject/PhysicalObjectDetail/@name')) PHYSICALOBJECTDETAIL as NAME |
| 20 | ), |

TABLE 3-continued

```
21  vin as (
22  select distinct
23  reference_key, VehicleId, vehicledetail as vin
24  from hv_vehdenormalized
25  where VehicleAttribute = 'vin'
26  ),
27  make as (
28  select distinct
29  VehicleId, vehicledetail as make
30  from hv_vehdenormalized
31  where VehicleAttribute = 'polkMake'
32  ),
33  model as (
34   select distinct
35  VehicleId, vehicledetail as model
36  from hv_vehdenormalized
37  where VehicleAttribute = 'polkModel'
38  )
39  select
40  a.reference_key, a.vin, b.make,c.model
41  from vin a
42  join make b on a.VehicleId = b.VehicleId
43  join model c on a.VehicleId = c.VehicleId
44  ;
```

The code in Table 3 is not only complicated, but it may also be not performant when querying against any significant volume of data. Lines 5, 11, 15, 19 use individual Xpath statements to derive the attribute required from the XML. Lines 15, 19 also include the Lateral View Explode in order to join individual XML attributes into a normalized result set. The remainder of the query denormalizes the already extracted XML attributes using conventional SQL.

The query may therefore be considered inefficient in comparison to the flattening of data and the querying of the flattened data as provided herein according to example embodiments. In some examples, querying the structured data with a program such as that of Table 3 may cause hang-ups, timeouts and/or crashes by the server and/or database. The example embodiments provided herein therefore provide an improvement to the functioning of the computer.

Figure 9:
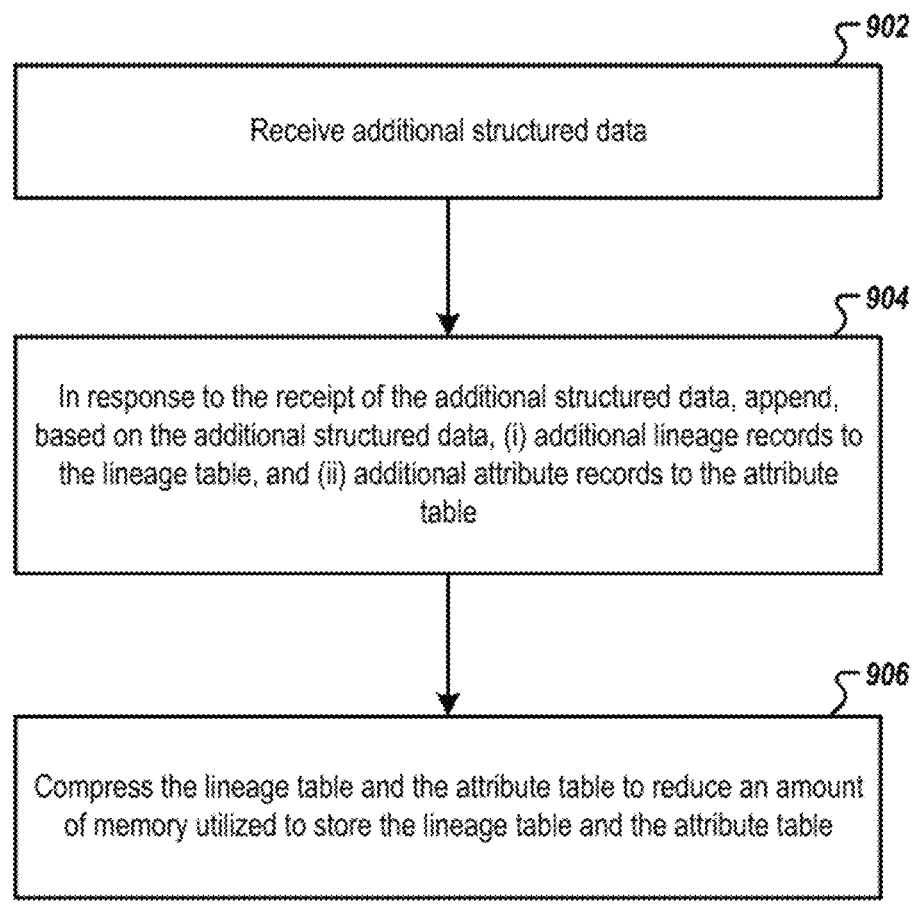
FIG. 9 is a flowchart illustrating various processes in accordance with example embodiments of the present disclosure.

While certain examples provided herein are simplified for the ease of illustration, it will be appreciated that according to certain example embodiments, the lineage and/or attribute tables may be updated on an ongoing basis as additional data is generated or received. FIG. 9 provides a flowchart illustrating various processes and procedures in accordance with example embodiments.

At block 902, data management computing entity 120 may include means, such as communications interface 320, processing element 305, volatile memory 315, non-volatile memory 310 and/or the like, for receiving additional structured data. The additional structured data may be received via a routine batch process, (e.g., nightly) or on an ad-hoc basis. In this regard, example embodiments may be configured to process structural data from a plurality of source computing entities 110. The processing and flattening of the data as described herein may occur without additional configuring of database tables, since the lineage table and/or attribute table may be predefined and configured to hold a large number of records representing elements having any node depth, potentially constrained only by the number of tag-value column pairs in the table. In some examples, the number of hierarchical elements may be expanded within the source code of example embodiments via a configuration update to a value indicating the number of tag-value column pairs. In this regard, example embodiments may read from a configuration file and/or the like to determine the number of columns in the lineage table.

At block 904, in response to the receipt of the additional structured data, example embodiments append, based on the additional structured data, (i) additional lineage records to the lineage table, and (ii) additional attribute records to the attribute table. The existing records in the lineage table may be maintained, and new records may be inserted based on the additional or newly received structured data. The lineage table may become increasingly larger (e.g., hold more records) over time as additional structured data is received and processed. The 'xmlID' may aide in linking the inserted data to the source structured data (e.g., document) and may be useful for audit purposes, validation, or for tracking the originating source of the data.

As such, example embodiments provide for subsequent processing of additional structured data, even if the format of the hierarchy, or expected format of the hierarchy changes over time. For example, new elements may appear in any level of the hierarchy, and example embodiments may accurately extrapolate and/or flatten the data as described herein. Example embodiments therefore enable analysts and/or the like to query the data or run reports in an efficient manner with reusable code. On the other hand, without the advantages of the present disclosure, the analysts or those running such reports would otherwise require extensive knowledge regarding the format of the structured data, and changes to the format occurring over time.

Moreover, despite the potentially large number of records in the database that could otherwise inhibit performance, efficient querying and reporting can still be achieved by compressing the database tables according to example embodiments.

At block 906, example embodiments may compress the lineage table and the attribute table to reduce an amount of memory utilized to store the lineage table and the attribute table. Example embodiments may use compression processes such as Optimized Row Columnar (ORC) file format to generate ORC Hive tables, as described in further detail and by way of example below, with reference to FIG. 10.

Figure 10:
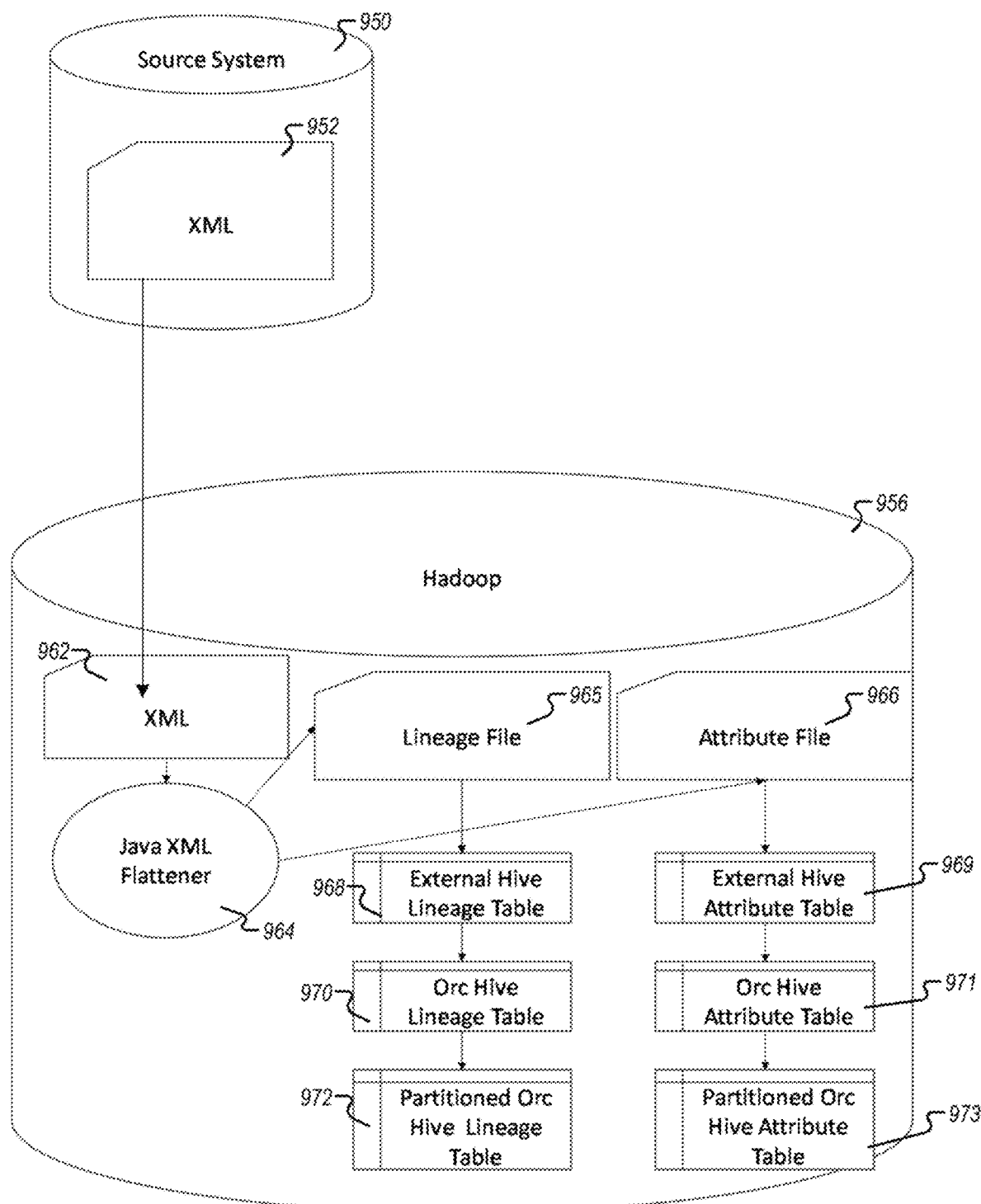
FIG. 10 is a diagram of a system that can be used to practice example embodiments of the present disclosure.

FIG. 10 is an architectural diagram illustrating the flow of data, and the flattening and compression of the data according to example embodiments provided herein. It will be appreciated that architecture set forth in FIG. 10 is provided merely as an example, and other implementations or modifications thereto may be made in order to utilize embodiments of the present disclosure.

As shown in FIG. 10, source system 950 may be an example of a source computing entity 110. Source system 950 may include, for example, a PAQ database and/or SME (Small to Medium Enterprise) Sever. The source system 950 may make structured data (XML) 952 available over a network, such as a local area network. As an example, the structured data 952 may include XML. For the purpose of example, an entry in the structured data 952 may include "<xml> <tag1 id="123">tagvalue</tag1> </xml>".

The data may be imported for processing by a distributed file system 956 such as a HDFS (Apache Hadoop® Distributed File System). Data may be transferred by FTP (file transfer protocol), distributed messaging (e.g., Kafka, International Business Machines MQ (Message Queue)) or other means and stored locally (962). In this regard, an example of the XML stored in 962 and associated with the structured data 952 may include "<xml><LOB id="123">Auto</tag1></xml>." In some examples, data analytics software, such as Apache Spark™ and/or the like may optionally perform analytical processes on the data and store resultant structured data or modify the stored structured data in 962.

The data management computing entity 120 may then flatten the data as provided herein (964), and store the data in the lineage file 965 and attribute file 966. In some examples, the Java XML Flattener 964 may be executed via Apache Spark™.

According to the example structured data provided above with respect to structured data 952 and 962, an associated entry in the lineage file 965 may include

| Xml_uuid | tag1_name | tag1_value | tag1_uuid |
|---|---|---|---|
| 1abc-145 | LOB | Auto | 34dc-321 . |

An associated entry in the attribute file 966 may include

| Xml_uuid | att_name | att_value | tag_uuid |
|---|---|---|---|
| 1abc-145 | id | 123 | 34dc-321 . |

According to certain example embodiments, the lineage file 965 may be accessible to external Hive lineage table 968, and converted into ORC Hive lineage table 970. Similarly, according to certain example embodiments, attribute file 966 may be accessible to external Hive attribute table 969, and converted into ORC Hive attribute table 971.

Example embodiments may append a column for partitioning to enable faster data access. The partitioning may be reflected in the partitioned ORC Hive lineage table 972 and/or partitioned ORC Hive attribute table 973. In this regard, the partitioned tables may provide columns that are candidates for logically grouping like data together (such as a Line Of Business). In some examples, the partitioned tables may include a two-level partition table, such as a table providing a Line of Business and a transaction date. The two-level partition table may be generated by joining the lineage table and attribute table, for example.

Compressing the lineage table and the attribute table as provided herein may enable (i) more efficient joining of the lineage table and the attribute table relative to joining of non-compressed tables, and (ii) more efficient querying of the joined lineage table and the attribute table relative to querying non-compressed tables. Due to the nature of the flattened tables, the amount of resulting rows may be large with several repeating values and/or several instances of null values. As a result, the dataset may be conducive for large amounts of compression (for example, the lineage table and/or attributes table may be compressed by approximately 90%). This may enable queries to be executed more efficiently than queries performed on non-compressed lineage tables and/or non-compressed attribute tables because of the amount of data that can fit into Hadoop blocks for processing, thereby reducing, limiting, and/or minimizing TO (input/output) operations required.

Performing the compression techniques on the tables may therefore enable practical and efficient use of big data whereas clients and data analysts may otherwise experience deadlocks when running a desired query. Accordingly, the method, apparatus and computer program product provide numerous technical advantages including the conservation of processing resources and the associated power consumption otherwise expended to support the querying and analysis of the structured data and to glean the desired information, generate reports, and/or the like.

IV. CONCLUSION

Many modifications and other embodiments set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for flattening structured data into one or more tables, the computer-implemented method comprising:
   receiving, by a processor, structured data comprising a plurality of elements arranged in a hierarchy, the structured data transmitted by a source computing entity; and
   transforming, by the processor, the structured data to lineage records in a lineage table of a relational database, wherein transforming the structured data to the lineage records comprises:
   generating a lineage record in the lineage table for each of the plurality of elements in the structured data, and
   populating each lineage record with (i) a value of the respective element, and (ii) a tag-value column pair for each ancestrally related element of the respective element, wherein each tag-value column pair comprises a column identifying an element name of the respective ancestrally related element, and a column identifying a value of the respective ancestrally related element.

2. The computer-implemented method of claim 1, further comprising:
   populating each lineage record with an indicator of a deepest element identified by the respective lineage record, wherein depth is defined by the hierarchy.

3. The computer-implemented method of claim 1, further comprising:
   populating, by the processor and based at least in part on the structured data, an attribute table of the relational database, wherein the attribute table comprises attributes of the plurality of elements, wherein populating the attribute table comprises inserting the attributes of the plurality of elements into respective attribute records, and wherein each attribute record is associated with a particular lineage record representing the element that the respective attribute describes.

4. The computer-implemented method of claim 3, further comprising:

receiving additional structured data; and in response to the receipt of the additional structured data, appending, based at least in part on the additional structured data, (i) additional lineage records to the lineage table, and (ii) additional attribute records to the attribute table.

5. The computer-implemented method of claim 3, further comprising:

compressing the lineage table and the attribute table to reduce an amount of memory utilized to store the lineage table and the attribute table.

6. The computer-implemented method of claim 5, wherein compressing the lineage table and the attribute table comprises enabling (i) more efficient joining of the lineage table and the attribute table relative to joining of non-compressed tables, and (ii) more efficient querying of the joined lineage table and the attribute table relative to querying non-compressed tables.

7. An apparatus for flattening structured data into one or more tables, the apparatus comprising at least one processor and at least one memory including computer program code, the at least one memory and the computer program code configured to, with the processor, cause the apparatus to at least:

receive structured data comprising a plurality of elements arranged in a hierarchy, the structured data transmitted by a source computing entity; and transform, by the processor, the structured data to lineage records in a lineage table of a relational database, wherein transforming the structured data to the lineage records comprises:

generating a lineage record in the lineage table for each of the plurality of elements in the structured data, and populating each lineage record with (i) a value of the respective element, and (ii) a tag-value column pair for each ancestrally related element of the respective element, wherein each tag-value column pair comprises a column identifying an element name of the respective ancestrally related element, and a column identifying a value of the respective ancestrally related element.

8. The apparatus of claim 7, wherein the at least one memory and the computer program code are further configured to, with the processor, cause the apparatus to at least:

populate each lineage record with an indicator of a deepest element identified by the respective lineage record, wherein depth is defined by the hierarchy.

9. The apparatus of claim 7, wherein the at least one memory and the computer program code are further configured to, with the processor, cause the apparatus to at least:

populate, based at least in part on the structured data, an attribute table of the relational database, wherein the attribute table comprises attributes of the plurality of elements, wherein populating the attribute table comprises inserting the attributes of the plurality of elements into respective attribute records, and wherein each attribute record is associated with a particular lineage record representing the element that the respective attribute describes.

10. The apparatus of claim 9, wherein the at least one memory and the computer program code are further configured to, with the processor, cause the apparatus to at least:

receive additional structured data; and in response to the receipt of the additional structured data, append, based at least in part on the additional structured data, (i) additional lineage records to the lineage table, and (ii) additional attribute records to the attribute table.

11. The apparatus of claim 9, wherein the at least one memory and the computer program code are further configured to, with the processor, cause the apparatus to at least:

compress the lineage table and the attribute table to reduce an amount of memory utilized to store the lineage table and the attribute table.

12. The apparatus of claim 11, wherein compressing the lineage table and the attribute table comprises enabling (i) more efficient joining of the lineage table and the attribute table relative to joining of non-compressed tables, and (ii) more efficient querying of the joined lineage table and the attribute table relative to querying non-compressed tables.

13. A computer program product for flattening structured data into one or more tables, the computer program product comprising at least one non-transitory computer-readable storage medium having computer-executable program code instructions stored therein, the computer-executable program code instructions comprising program code instructions to:

receive structured data comprising a plurality of elements arranged in a hierarchy, the structured data transmitted by a source computing entity; and transform the structured data to lineage records in a lineage table of a relational database, wherein transforming the structured data to the lineage records comprises:

generating a lineage record in the lineage table for each of the plurality of elements in the structured data, and populating each lineage record with (i) a value of the respective element, and (ii) a tag-value column pair for each ancestrally related element of the respective element, wherein each tag-value column pair comprises a column identifying an element name of the respective ancestrally related element, and a column identifying a value of the respective ancestrally related element.

14. The computer program product of claim 13, wherein the computer-executable program code instructions further comprise program code instructions to:

populate each lineage record with an indicator of a deepest element identified by the respective lineage record, wherein depth is defined by the hierarchy.

15. The computer program product of claim 13, wherein the computer-executable program code instructions further comprise program code instructions to:

populate, based at least in part on the structured data, an attribute table of the relational database, wherein the attribute table comprises attributes of the plurality of elements, wherein populating the attribute table comprises inserting the attributes of the plurality of elements into respective attribute records, and wherein each attribute record is associated with a particular lineage record representing the element that the respective attribute describes.

16. The computer program product of claim 15, wherein the computer-executable program code instructions further comprise program code instructions to:

receive additional structured data; and in response to the receipt of the additional structured data, append, based at least in part on the additional structured data, (i) additional lineage records to the lineage table, and (ii) additional attribute records to the attribute table.

17. The computer program product of claim 15, wherein the computer-executable program code instructions further comprise program code instructions to:

compress the lineage table and the attribute table to reduce an amount of memory utilized to store the lineage table and the attribute table.

* * * * *